US 6,657,676 B1

(12) United States Patent
Borneo et al.

(10) Patent No.: US 6,657,676 B1
(45) Date of Patent: Dec. 2, 2003

(54) SPATIO-TEMPORAL FILTERING METHOD FOR NOISE REDUCTION DURING A PRE-PROCESSING OF PICTURE SEQUENCES IN VIDEO ENCODERS

(75) Inventors: Antonio Maria Borneo, Matera (IT); Lanfranco Salinari, Castellaneta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 444 days.

(21) Appl. No.: 09/710,502

(22) Filed: Nov. 10, 2000

(30) Foreign Application Priority Data

Nov. 12, 1999 (EP) ............................................ 99830705

(51) Int. Cl.[7] ................................................. H04N 5/21
(52) U.S. Cl. ........................ 348/607; 348/608; 348/620; 348/619
(58) Field of Search ................................. 348/607, 618, 348/619, 620, 621, 624, 608, 612; 382/260, 266, 275; H04N 5/21

(56) References Cited

U.S. PATENT DOCUMENTS 6,005,626 A * 12/1999 Ding ........................... 348/608
6,067,125 A * 5/2000 May ............................ 348/607

FOREIGN PATENT DOCUMENTS

EP 0601655 6/1994 ............ H04N/5/21

OTHER PUBLICATIONS

Hann et al., *Television Noise Reduction IC*, IEEE Transactions on Consumer Electronics, US, IEEE Inc. New York, vol. 44, No. 1, Feb. 1, 1998, pp. 143–154.

* cited by examiner

*Primary Examiner*—Sherrie Hsia
(74) *Attorney, Agent, or Firm*—Lisa K. Jorgenson; Allen, Dyer, Doppelt, Milbrath & Gilchrist, P.A.

(57) ABSTRACT

A method of filtering noise from digital pictures includes selecting a first set of pixels including the union of a pixel of the current picture to be filtered and a second set of pixels temporally and spatially near the pixel. A certain number of extended sums of values assumed by as many pre-established weight functions of the intensity of a selected video component on the first set of pixels is also calculated. The second set of pixels may belong to the current picture or to a preceding picture. Several noise filters for digital pictures are also provided.

23 Claims, 7 Drawing Sheets

SPATIO-TEMPORAL FILTERING METHOD FOR NOISE REDUCTION DURING A PRE-PROCESSING OF PICTURE SEQUENCES IN VIDEO ENCODERS

FIELD OF THE INVENTION

The present invention generally relates to the field of video image processing and, more particularly, to techniques for filtering noise from digital video pictures.

BACKGROUND OF THE INVENTION

The present invention is useful for filtering digital video sequences corrupted by high noise levels. Because of the particular importance of the Moving Pictures Experts Group (MPEG) standard in treating digitized video sequences, reference will be made to an MPEG2 system to illustrate an implementation of the present invention. Of course, those of skill in the art will appreciate that the invention may also be used in various systems for transferring video sequences based on different standards, as established from time to time. The main application of the invention is picture pre-processing before the MPEG2 or other standard coding. Even so, it is possible to use the invention outside a coding process, such as in a TV set for filtering the pictures to be displayed upon reception, for example.

Pre-processing pictures to be coded according to the MPEG2 standard provides great enhancement of the coding efficiency. For example, see A. van der Werf et al., "I.McIC: a single-chip MPEG-2 video encoder for storage", IEEE Journal of Solid-State Circuits, Vol.32, n. 11, November 1997; and L. Yan, "Noise reduction for MPEG type of code", Proc. IEEE Int. Conf Acoust., Speech, Signal Process., 1994. Additionally, many filtering techniques of pictures have been developed. See J. C. Brailean, R. P. Kleihorst, S. Efstratiadis, A. K. Katsaggelos and R. L. Lagendijk, "Noise reduction filters for dynamic image sequences: a review," Proc. IEEE, vol. 83, pp. 1270–1292, September 1996. In many cases, burdensome aspects of these techniques may have include high calculation power requirements or the need for several iterations on the same picture. As a consequence, these methods are either too expensive or too difficult to implement for real-time video applications.

Prior art real-time video filtering techniques (see, e.g., E.Dubois and S.Sabri, "Noise reduction in image sequences using motion-compensated temporal filtering", IEEE Trans. on Communications, vol. COM-32, pp. 826–831, July 1984) typically base the filtering operations on the separation distances among the unfiltered grey level of the pixel to be filtered ($P_o$) and the grey levels of other pixels of a working window. The effectiveness of the filtering in this case is inversely proportional to the size of these distances. As a consequence, the pixels corresponding to such large distances are not involved in the filtering operations. This is a coarse method of segmenting the picture that avoids the calculation of the average of pixels belonging to different objects. This operation would cause an out of focus of the picture and, in the case of a temporal filter, also the appearance of "tails."

The document WO 97/30545 discloses a motion-compensated recursive filter based on the above method. Such a filter, depending on the absolute value of the difference between the current pixel and the corresponding pixel in the preceding picture, establishes the value of a coefficient or fraction β. The filter further combines the fraction β of the current pixel with a fraction 1-β of the corresponding pixel in the preceding motion-compensated picture. Such a system is substantially an infinite impulse response (IIR) adaptive filter of the first order. This technique has the drawback of leaving unchanged the current pixel if it is too different from the corresponding pixel of the preceding picture, even if such difference could be due to noise.

A spatial adaptive low pass filter whose adapting mechanism is based on the calculation of the difference among $P_o$ and the other pixels of the working window is disclosed in EP 878,776 A1. A local evaluation of certain parameters of the picture is carried out (for example, whether the considered pixel belongs to a uniform zone or not). On that basis it may be determined whether the pixel to be filtered is near to or far from the other pixels, by way of a fuzzy logic process. Near pixels are given more weight than far pixels in the calculation of the value of the filtered pixel. Yet, even in this case the effectiveness of such a filter in the presence of high noise levels is not high. This is because the decision that is made to assess whether the considered pixel belongs to a uniform zone (and therefore if it is possible to filter more) or not is based on distances among P and the surrounding pixels.

In the article entitled "A method of noise reduction on image processing", IEEE Transactions on Consumer Electronics, Vol. 39, N. 4, November 1993, by S. Inamori et al., a temporal filter is described that is based on the above-described filter of Dubois and Sabri but which is more sophisticated. That is, the input-output characteristic is adaptively chosen as a function of the expected power of the noise. The filter is turned off by signals coming from a motion detection section to avoid the generation of trails and by an edge detection block to prevent causing the picture to be out of focus. Even so, this filter suffers similar drawbacks to the previously mentioned prior art filters and must be turned off in the presence of noise peaks.

These known techniques become unsatisfactory in the presence of high noise levels. It becomes necessary to turn off the filter every time a noise peak ("spike") is superimposed on the pixel $P_o$ being processed. High noise peaks are noise samples of a value much higher than other samples. Although these noise peaks have a rather small probability because the queues of the stochastic distribution of many kinds of noise (e.g. Gaussian noise) are theoretically infinite, they occur nonetheless. In such cases, the above mentioned prior art filters always interpret higher than normal differences among the current pixel and the neighboring pixels as if the picture is not stationary and not as if the picture is corrupted by noise. Therefore, the performance of noise reduction of the filters is significantly limited.

A well known technique for selecting the pixels of the working window is the so called "Duncan Range Test" (DRT) (see D. B. Duncan, "Multiple range and multiple f-tests", Biometrics, vol. 11, pp. 1–42, 1955) which has been used with good results. For example, see R. P. Kleihorst, "Noise filtering of image sequences," Ph.D. Thesis TU-Delft, Information Theory Group, 1994. In order to highlight the characteristics of the DRT, a brief description follows. Suppose a set of data, e.g., the luminance values of the pixels to be filtered, is organized in an increasing order as follows:

$$g_{(1)} \leq g_{(2)} \leq \ldots \leq g_{(n)}$$

where the number in parentheses indicates the position assumed in the ordered set. The DRT is based on the definition of a set of "similar" values, meaning that two values are considered "similar" if:

$$\frac{|g_{(i)} - g_{(j)}|}{\sigma_n} \leq \rho_{|i-j|,a}$$

where $\sigma_n$ is the standard deviation of the superimposed noise that is considered known. $\rho_{|i-j|,a}$ is a value that depends on the precision level a of the test, by the number $|i-j|$ of data, that in the specific case is a number of pixels between $g_{(i)}$ and $g_{(j)}$, and by the stochastic distribution of the noise. $\alpha$ represents the probability of taking a wrong decision. Obviously, the smaller $\alpha$ is, the smaller $\rho$ is, and so the more restrictive the test is.

With these premises, the object of the DRT is to find the sub-set including the current pixel $P_o$ and including the greatest number of "similar" pixels. In other words the following sub-set of pixels must be determined:

$$g_{(i)}, \ldots, P_o, \ldots, g_{(j)}$$

where i and j are such that:

$$j - i = \underset{i',j'}{\text{MAX}}(j' - i') \text{ where } j' \text{ and } i' \text{ satisfy the conditions:}$$

$$\begin{cases} \dfrac{|g_{(i)} - g_{(j)}|}{\sigma_n} \leq \rho_{|i-j|,a} \\ g_{(i')} \leq P_o \leq g_{(j')} \end{cases}$$

The successive filtering operations are performed only on the pixels belonging to the selected range. Notably, the DRT does not have as a unique reference value the value of $P_o$ in establishing which pixels are to be filtered together with the current pixel and which pixels are not to be filtered. This test is substantially based on an external measurement of the standard deviation of the noise $\sigma_n$ to test all intervals containing $P_o$, not necessarily those symmetrical to it, and select the interval containing the largest number of data (i.e., of pixels).

The DRT has been implemented in filters for digital pictures. Such filters, showing a relative insensibility to the value to be filtered $P_o$, allow more effective filtering in rather uniform zones where the noise is more readily detectable, though safeguarding the contours of objects and avoiding the formation of "trails." Yet, despite the relative simplicity with which the DRT may be described, it may be difficult to determine the set of data to process. In fact, the amplitude of the interval, given by the product $\sigma_n \cdot \rho_{|i'-j'|,a}$, depends on many factors, such as the precision level $\alpha$ of the test, the noise level $\sigma_n$, and the number of pixels that are included in this range. The latter dependency, in particular, greatly complicates the algorithm. This is because it makes necessary the testing of a great number of sub-sets of pixels containing Pbefore being able to identify the sub-set containing the largest number of data.

Accordingly, there is a need for a filter for digital video pictures that, while retaining the advantages of the DRT, does not leave unattenuated large noise peaks. This would severely degrade the efficiency of the MPEG2 coding and of any other system of video compression downstream of the filter. Furthermore, such filter should not involve a high computational complexity. Otherwise, the cost for real-time video applications would be prohibitive.

SUMMARY OF THE INVENTION

It is an object of the present invention to provide a new filtering method and filter for digital video pictures having the advantages of the DRT while substantially eliminating the noise peaks and being relatively easy to implement, making it relatively inexpensive for use in real-time video applications, for example.

According to the present invention, a method of filtering noise from digital pictures includes selecting a first set of pixels including a pixel to be filtered from the current picture and a second set of pixels temporally and spatially near the pixels of the first set. The method may also include calculating a certain number of extended sums of values assumed by as many pre-established weight functions of the intensities of a filtered selected video component on the first group of pixels. Furthermore, the intensity of the filtered selected video component of the pixel to be filtered may be calculated as a function of the extended sums and of the sums weighted with the weight functions of the intensities of the selected video component over the first set of pixels.

The method of the present invention may be implemented even while choosing the pixels of the second set of pixels exclusively from the current picture or from a preceding picture. Each of the pre-established weight functions may be made specular to a respective central value calculated as a function of the unfiltered selected video component in the pixel to be filtered and of the noise level. Furthermore, the intensity of the selected filtered video component of the pixel to be filtered may be a weighed average with pre-established weights of the ratios among the weighed sums and the extended sums.

A noise filter for digital pictures according to the present invention includes a certain number of first circuit blocks, each being input with a set of pixels including a pixel to be filtered from the current picture and a second set of pixels temporally and spatially near the pixel to be filtered. Each block may produce an extended sum of the values assumed by a respective pre-established weight function of intensity of a selected video component on the first set of pixels. Furthermore, each block may produce the weighted sum with the respective weight function of the intensities of the selected video component on the first set of pixels. A second circuit block, having inputs coupled to the outputs of the first circuit blocks, may calculate the intensity of the filtered selected video component in the pixel to be filtered as a function of the weighed sums and the extended sums.

Each weight function may be specular to a respective central value calculated as a function of the intensity of the unfiltered selected video component of the pixel to be filtered and of the noise level. Also, the weight functions of the filter may be determined using tail detection.

BRIEF DESCRIPTION OF THE DRAWINGS

The particular aspects and advantages of the invention will become even more evident from the description of several embodiments of the invention made with reference to the attached drawings, wherein.

DETAILED DESCRIPTION OF THE PREFERRED EMBODIMENTS

Figure 1A:
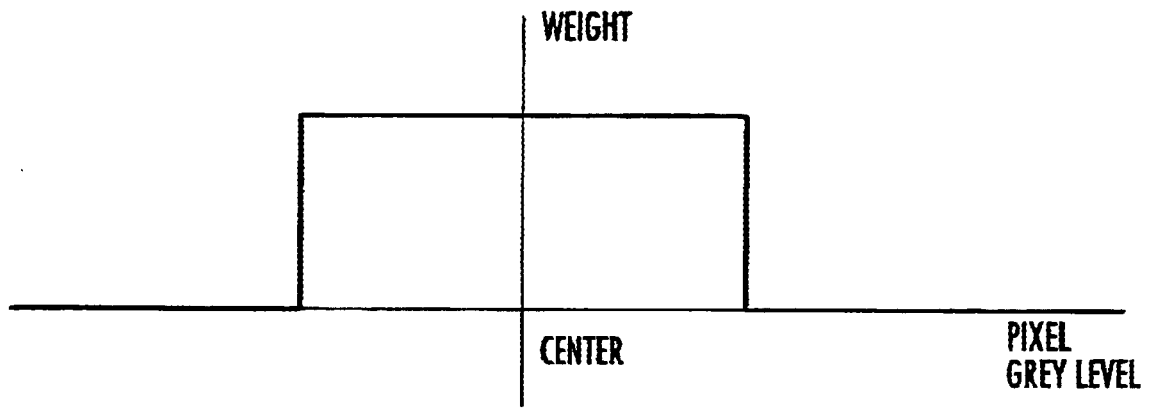
FIG. 1a is a diagram of a typical shape of the weight function of the DRT, according to the prior art.

The main difference between the proposed method and the DRT resides in the way the pixels to be filtered are chosen and in the operations performed on the pixels. The DRT implies the choice of the largest set of pixels "similar" to the pixel to be filtered, on which the filtering operations are successively made. From a mathematical point of view, considering only the pixels of the chosen set and neglecting the others is equal to weighing with a "1"coefficient the pixels of the chosen set and with a "0"coefficient the pixels outside such a set. This may be thought of as weighing pixels with a "rectangular" weight function, as the one depicted in FIG. 1a. The choice of such a weight function offers the possibility of effectively filtering uniform zones of pictures while safeguarding the contours of objects to avoid creating out of focus effects in the filtered picture. Even so, this weight function does not eliminate the nuisance represented by noise peaks.

Figure 1B:
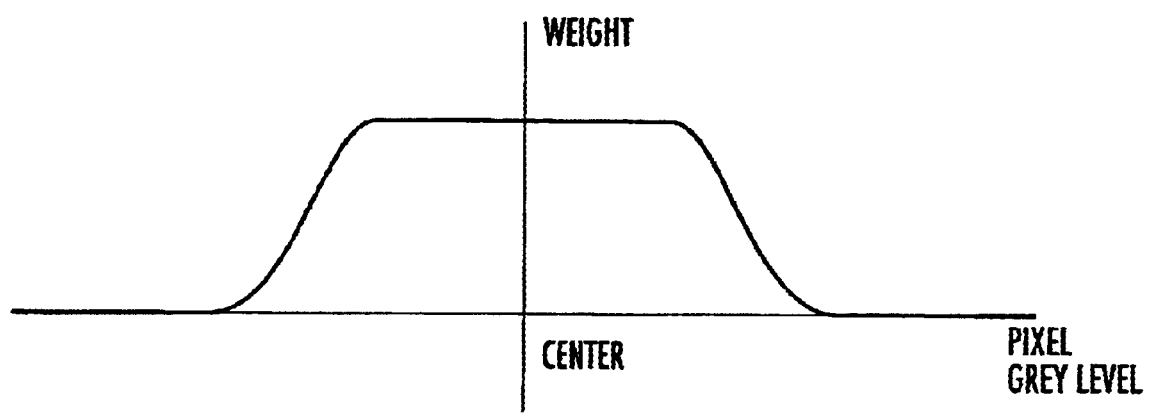
FIG. 1b is a diagram of a possible shape of the weight function of the method of the present invention.

The method of the present invention overcomes the previously unresolved problems caused by large noise peaks by employing weight functions of a shape as generally depicted in FIG. 1b. These weight functions are ideally obtained by attaching appropriate queues to the rectangular weight function of the classic DRT. For each available weight function $k_j$, the sum of weights SUMk$_j$ corresponding with the values of the intensity of the selected video component in the pixel to be filtered and in the near or adjacent pixels is calculated. Once the weight function $k_M$ maximizing such a sum of weights is determined, such a function is used for the following filtering operations.

An important result is the almost complete deletion of noise peaks that the known filtering method based on the DRT left unattenuated. In fact, when a noise spike happens to be superimposed on the current pixel, because of the queues of the weight function it is possible to involve in the filtering even pixels with levels of the selected component (e.g. luminance) that are different from that of the current pixel $P_o$. By elaborating such luminance levels (e.g., by carrying out a weighted average) it is possible to substantially delete the noise pulse. Another important difference between the method of the invention and the DRT includes the relatively small number of operations that are required, which makes the present invention less expensive for use in real-time video applications.

In the DRT the amplitude of the interval to select depends on many factors, such as the precision level α of the test, the number of pixels inside the interval, and the standard deviation $\sigma_n$, of the superimposed noise. In the method of the present invention, the weight functions do not depend on the number of pixels inside the interval or on the value of α but instead on the noise level NL. In this way the dependencies that made the computational complexity relatively high are substantially eliminated.

Given that often the noise level can be conveniently described by its standard deviation $\sigma_n$, in the following description an embodiment of the invention referring to such a case will be considered. Of course, the invention is equally applicable even when choosing a parameter for describing the noise level NL different from the standard deviation $\sigma_n$. Moreover, while the DRT tests any possible interval including $P_o$, the method of the invention contemplates the testing of only a relatively small number of such intervals though preserving the advantageous aspects of the DRT.

The operations required for choosing the group of pixels on which to work (i.e., the Working_Window,) are slightly more complicated that those of the DRT because of the presence of queues in the weight function. Nevertheless, if such a set contains a sufficiently large number of pixels, it has been observed that the filtering becomes relatively insensitive to the actual shape of the queues. Therefore, it is possible to quantize in any manner the weight function only, by assigning to it only values equal to powers of two, thus greatly simplifying a hardware implementation.

Figure 2:
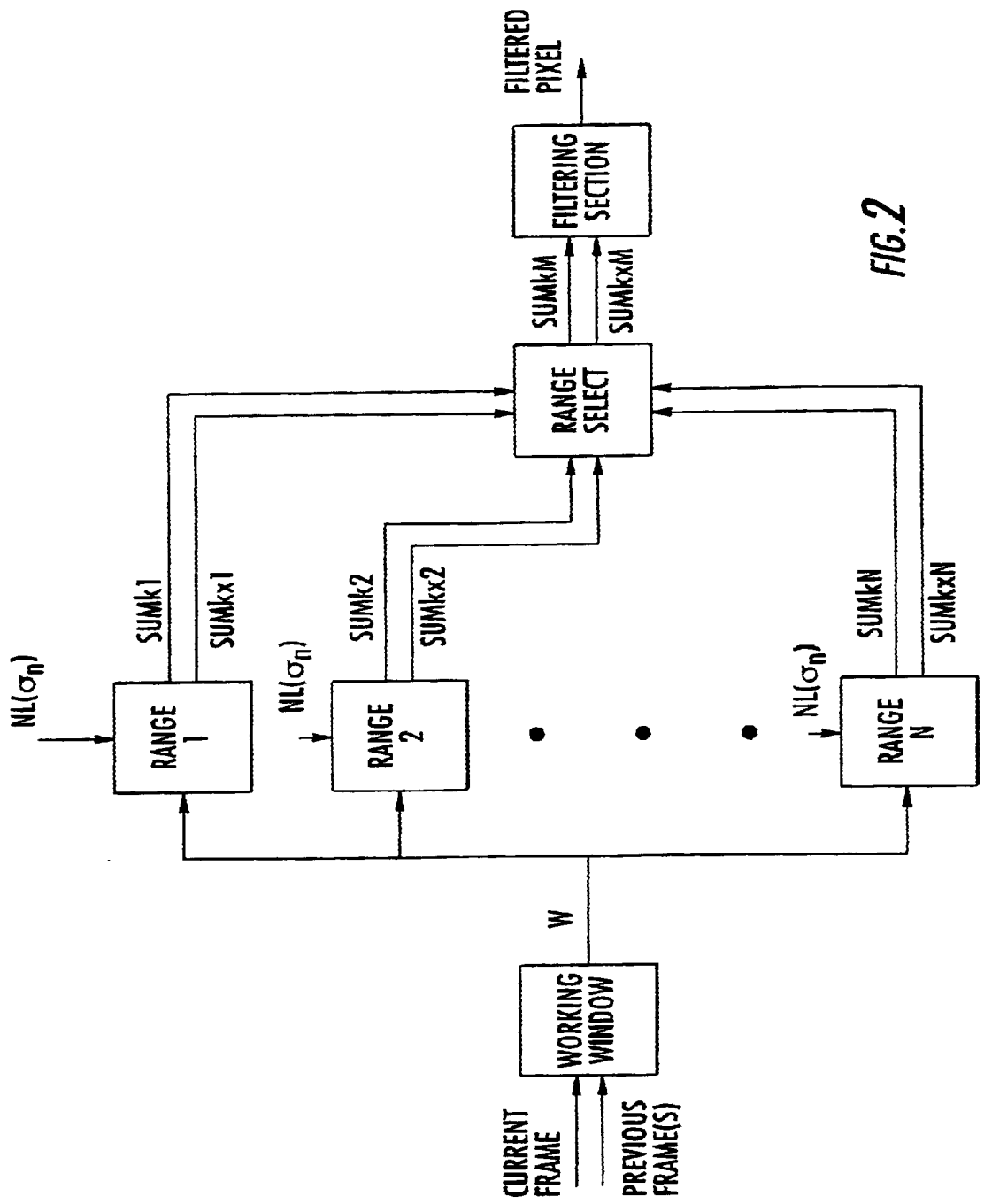
FIG. 2 is a schematic diagram of a filter made according to the invention.

One embodiment of a filter according to the present invention is shown in FIG. 2. The block WORKING WINDOW selects the set of pixels including the Working_Window, which includes the pixel $P_o$ to be filtered belonging to the current picture and a second set of pixels Pixel_Near, temporally and spatially near $P_0$. The second set, Pixel_Near, may include pixels belonging only to the current picture or pixels belonging to the current picture and pixels belonging to preceding pictures. The values of the pixels of the window are then input into an array of N blocks or units (RANGEj, where j=1,2, . . . , N). Each block effects the weighting of the intensity of the selected video component, according to its own weight function, in the pixels of the Working_Window.

The blocks RANGEj may be provided with information on the noise level NL in order to produce its own weight functions based on the noise level NL. Such blocks output respective extended sums $$SUMk_j = \sum_{Pi \in Working\_Window} \cdot k_{ij}$$

of the values assumed by their own weight function on the pixels of the Working_Window and the respective weighed sums $$SUMkx_j = \sum_{Pi \in Working\_Window} k_{ij} \cdot P_i$$

of the intensity of the selected video component. The block FILTERING SECTION provides the value of the intensity of the filtered pixel FILT.

A block RANGE SELECT may be coupled before the FILTERING SECTION to the outputs of the N blocks RANGEj. The block RANGE SELECT performs the selection of the maximum extended sum SUMk$_M$ and the respective weighed sum SUMkx$_M$. One of the possibilities of implementing the block FILTERING SECTION is that of calculating a simple weighed average of pixels of the chosen interval, i.e. to make $$FILT = \mu = \frac{\sum_{Pi \in Working\_Window} k_{ij} \cdot P_i}{\sum_{Pi \in Working\_Window} k_{ij}}$$

In another alternative the weighed sum A may be combined with the current pixel, for example:

$$FILT = \mu + \alpha \cdot (P_o - \mu)$$

where the coefficient $\alpha$ is established, for example, depending on the chosen interval for the filtering operations. Such a coefficient $\alpha$ may be even calculated based upon the value of the local variance $\sigma^2_g$ of the picture compared to a parameter representative of the noise level, such as the noise variance $\sigma^2_n$, for example, as in a switching filter:

$$a = \text{MAX}\left\{\frac{\sigma^2_g - \sigma^2_n}{\sigma^2_g}, 0\right\}$$

See, for example, R. P. Kleihorst, "Noise filtering of image sequences," Ph.D. Thesis TU-Delft, Information Theory Group, 1994. Generally the FILTERING SECTION can calculate the value of FILT starting from all the values of SUMk$_j$ and SUMkx$_j$.

Figure 3:
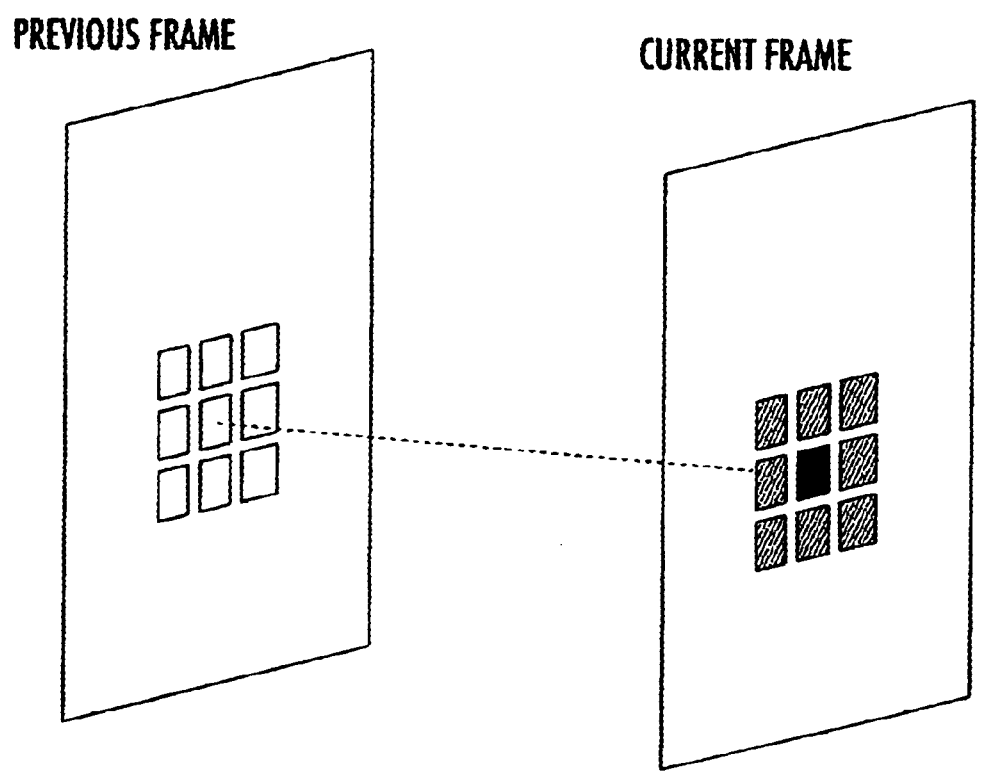
FIG. 3 is a schematic diagram of an example of the choice of pixels temporarily and spatially near a pixel of the current picture being filtered.
Figure 4:
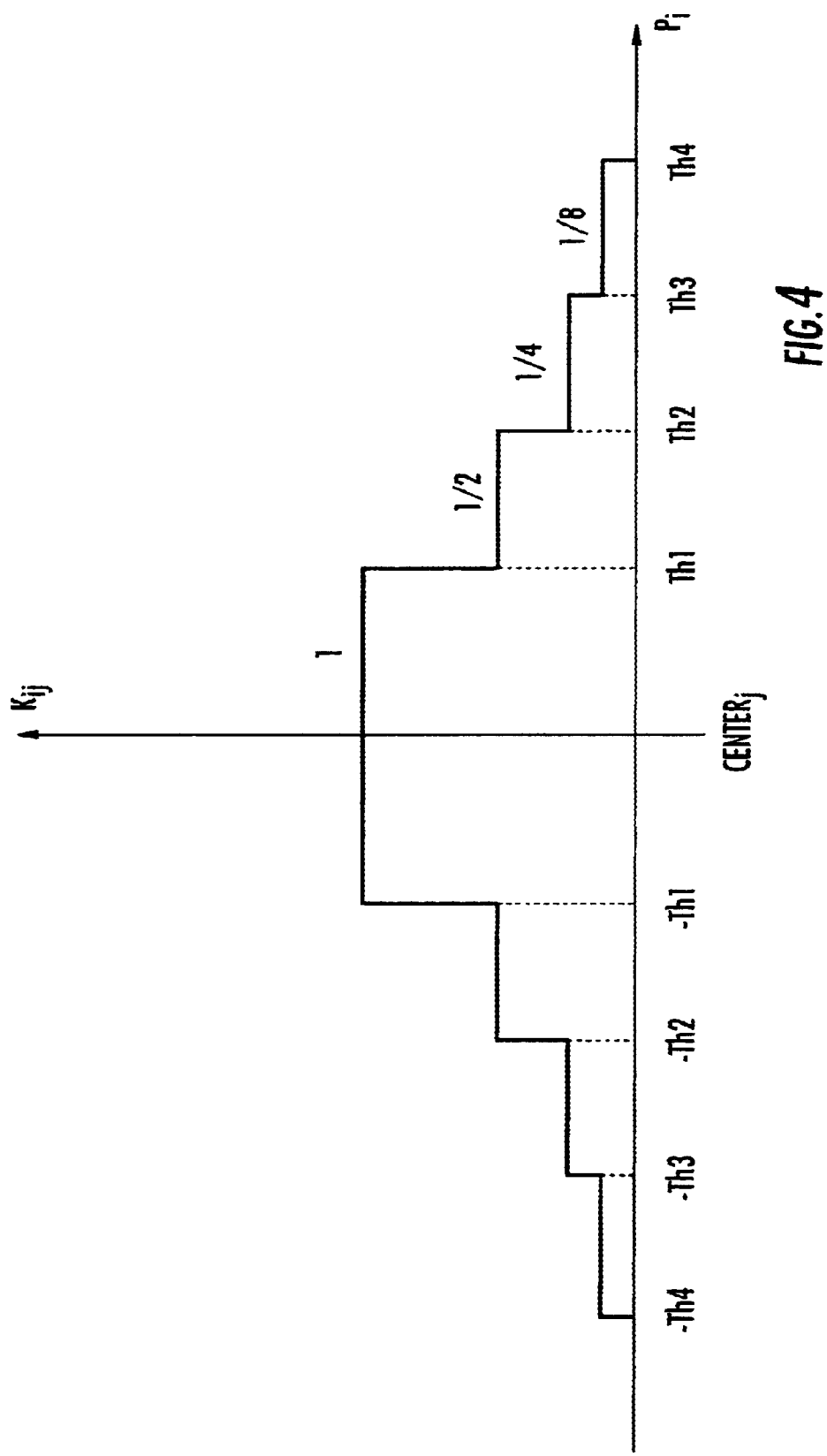
FIG. 4 is a diagram of an exemplary quantized weight function.

The WORKING WINDOW block defines the set of pixels, Working_Window, that may include pixels belonging to the current picture and to a preceding picture, as shown in FIG. 3, for example. The latter may be the picture corrupted by noise or the filtered picture. In any case, the Working_Window can only be of the spatial kind if a frame memory storing the current picture or the preceding pictures is not available. One of the possible ways of producing the different weight functions is to make them of the same shape, as shown in FIG. 4, and to center them on different positions CENTERj for each block RANGEj.

The set of possible values of CENTERj for the various blocks RANGEj is determined as a function of the intensity of the selected video component in the pixel to be filtered, $P_o$, of the index j, and of the noise level NL which, according to that which has been stated above, can be fully described by $\sigma_n$ where:

$$\text{CENTERj} = \text{CENTER }(P_o, \sigma_n, j)$$

An example of a possible choice of the values of CENTERj is given by:

$$CENTERj = P_o + \frac{2\sigma_n}{N-1}(j-1) - \sigma_n \text{ where } j = 1, \ldots, N$$

which produces N values of CENTERj equally spaced between $P_o - \sigma_n$ and $P_o + \sigma_n$.

By way of example, a possible shape of a weight function is shown in FIG. 4. The separation of the thresholds Th1, Th2, ..., ThM from CENTERj is a function of $\sigma_n$. The indicated coefficients are equal to powers of two, thus simplifying the hardware implementation of the filter. Of course, these coefficients may be given different values in other cases, such as where the filter of the invention is employed in a non real-time application, for example.

Because the filter shown in FIG. 2 is not provided with a $\sigma_V$ estimator, in order to get an estimation of the noise level an automatic system or a manual external regulation of the desired degree of filtering may be used. In both cases it is possible to over-estimate $\sigma_n$, and so, in the case of a spatio-temporal window, to produce artifacts such as "tails" (known in the art as "comet tails" or simply as "tails").

Figure 5:
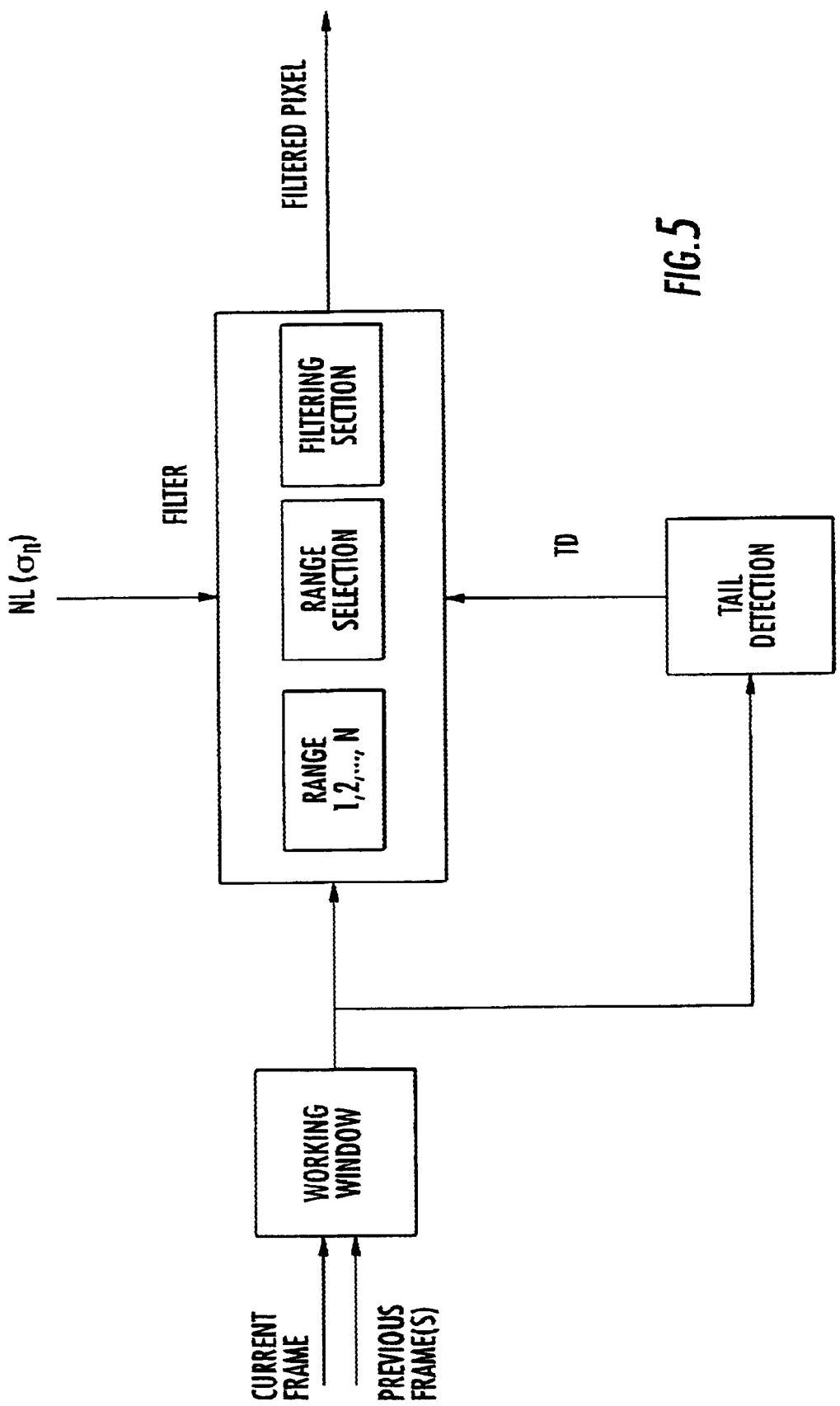
FIG. 5 is a schematic diagram illustrating an embodiment of the filter of the invention including a circuit for detecting tails.

It is necessary in such cases to include a circuit block for detecting an eventual generation of trails ("tails detection") to regulate accordingly the filtering operations. A system including such a tail detection circuit TAIL DETECT is illustrated in FIG. 5. The block FILTER, including the blocks RANGEj (where j=1,2, ..., N), RANGE SELECT, and FILTERING SECTION is coupled to the TAIL DETECT block which examines the pixels of the Working_Window and eventually generates a tail detection signal TD.

In the case of tails detection, many different corrections of the problem are possible. For example, the block FILTER may disable the filtering depending on the signal TD and output the value of the current pixel $P_o$. The block FILTER may also perform the filtering only on pixels belonging to the current frame, or it may reduce the influence of pixels of the preceding picture on the filtering process. Therefore, the block FILTER shown in FIG. 5 may include dedicated circuits that, depending on the signal TD, generate the desired control action.

Figure 6:
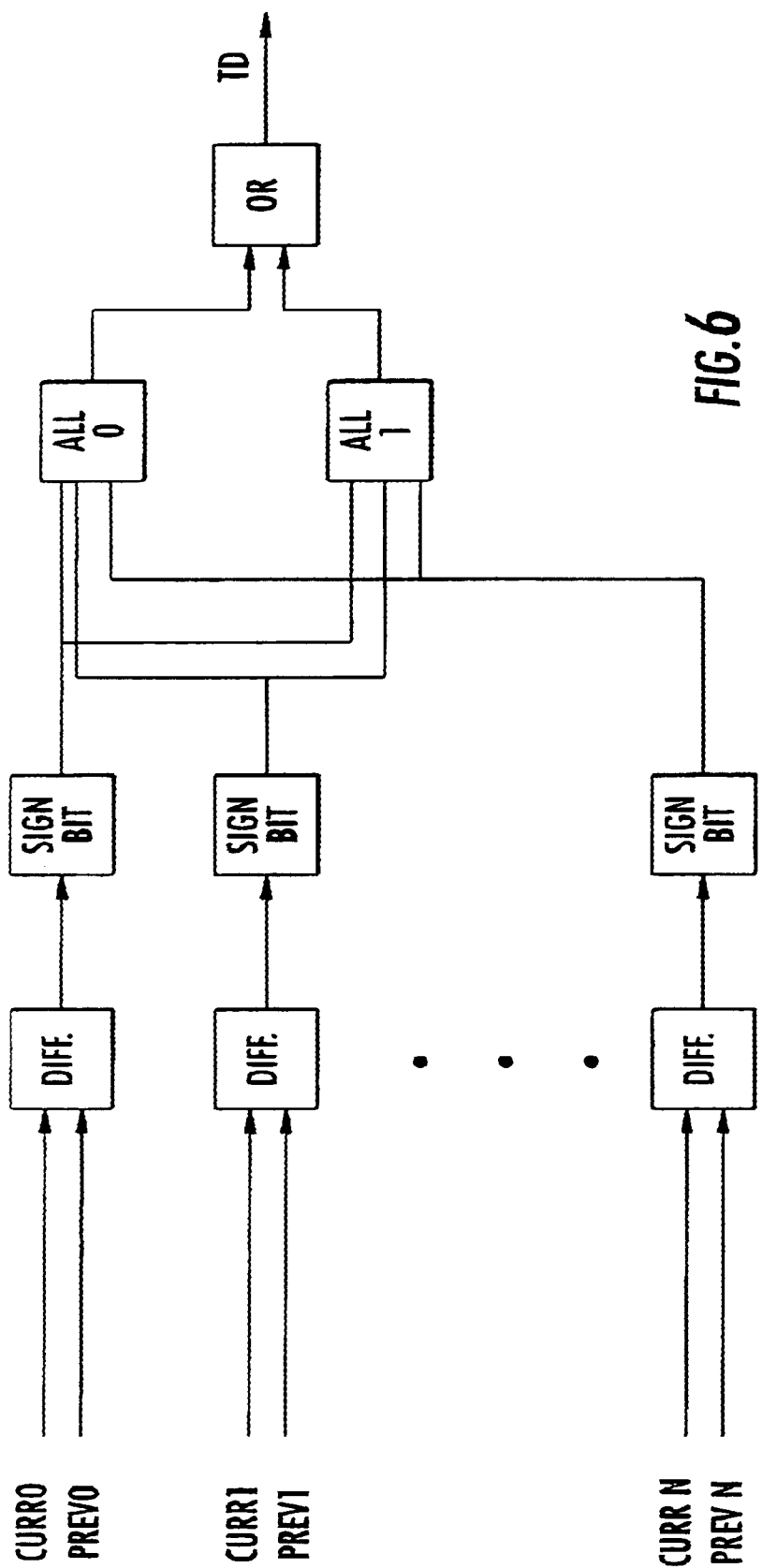
FIG. 6 is a schematic diagram illustrating an example of the circuit for detecting tails of FIG. 5.
Figure 7:
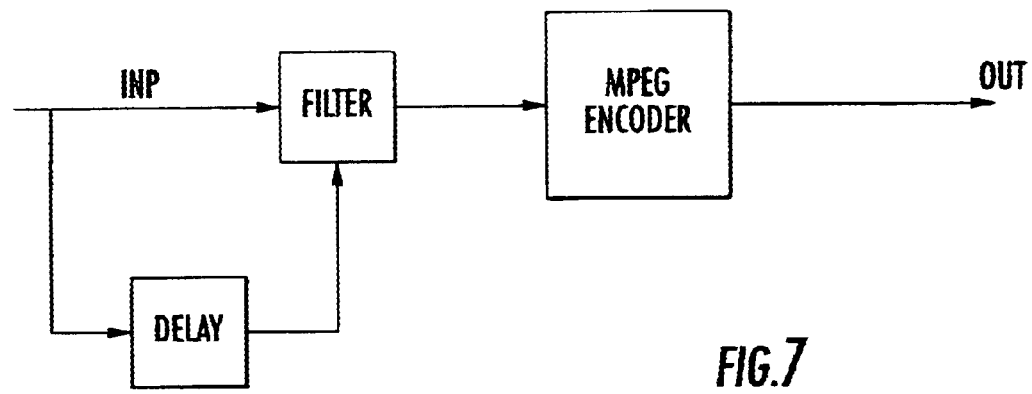
FIG. 7 is a schematic diagram of a coupling circuit for coupling the filter of the present invention to an MPEG2 encoder.

An example of how the block TAIL DETECT may be implemented is depicted in FIG. 6. See also S. Inamori, S. Yamauchi, K. Fukuhara, "A method of noise reduction on image processing," IEEE Transaction on Consumer Electronics, Vol. 39, N. 4, November 1993. The difference among pixels of the current picture and the corresponding pixels of the preceding figure is carried out by the blocks DIFF. The blocks DIFF are coupled to a corresponding number of blocks SIGN BIT producing the bits indicating the sign of the relative differences. These bits are input into the blocks ALL0 and ALL1, which output a 1 if the bits input are all 0 or all 1, respectively. The output flag TD is produced by the logic OR of the outputs of ALL0 and ALL1. The filter can be upstream of an MPEG2 encoder, as depicted in FIG. 7, or may be included in it. See, for example, W. Bruls, R. P. Kleihorst, A. Van der Werf, WO 97/30545, filed Jan. 23, 1997.

As shown in FIG. 7, an MPEG encoder outputting a coded bitstream OUT is coupled to the output of the FILTER of the invention. The MPEG encoder performs a preprocessing of the input picture INP, using delayed replicas of pictures provided by a delay block DELAY. The MPEG encoder may include a block for motion-estimation to make a motion-compensated filtering, thus increasing the efficiency of the filtering and of the coding.

Figure 8:
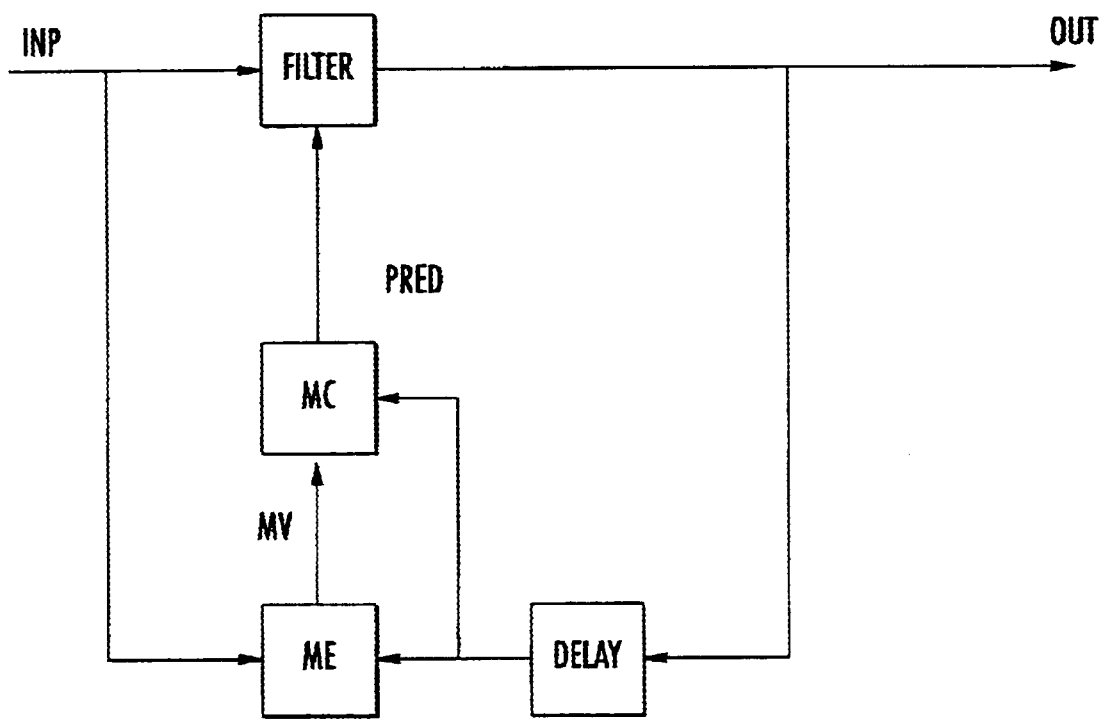
FIG. 8 is a schematic diagram of a coupling circuit for coupling the filter of the invention to a motion-compensation circuit.

It is also possible to use a motion-compensation filter separated from an MPEG2 encoder, as illustrated in FIG. 8. The filter of the invention FILTER receives at its input the picture to be filtered INP and a predicted picture PRED and outputs a filtered picture OUT. The predicted picture PRED is obtained by the combined action of a motion-compensation block MC, a motion estimator block ME, and a delay block DELAY. The motion estimator ME produces, from the current picture INP and from replicas of previously filtered pictures OUT, the motion vectors MV that are used by the motion-compensation block MC suitably delayed by a delay block DELAY. The motion-compensation block MC calculates a predicted picture PRED as a function of the motion vectors MV and of the delayed pictures provided by the DELAY.

Tests have confirmed that the same hardware structure used for filtering luminance may also be used for filtering chrominances. It is possible to use three identical filters for each of the video signals, so long as they are provided with appropriate values of respective noise levels that are generally different for the three video signals.

That which is claimed is:

1. A method of filtering noise from digital pictures comprising:

selecting a first set of pixels comprising a union of a first pixel of a current picture to be filtered and a second set of pixels temporally and spatially adjacent the first pixel; and calculating a predetermined number of extended sums of values taken by a corresponding number of predetermined weight functions of intensities of a selected video component on the first set of pixels, an intensity of a filtered selected video component of a filtered pixel comprising a weighted average with predetermined weights of the ratios among weighted sums and the extended sums.

2. The method of claim 1 wherein the second set of pixels belongs to the current picture.

3. The method of claim 1 wherein the second set of pixels belongs to a preceding picture.

4. The method of claim 1 wherein each of the predetermined weight functions is specular to a respective central value calculated as a function of an unfiltered selected video component of the pixel and of a noise level.

5. The method of claim 1 wherein the intensity of the filtered selected video component of the filtered pixel is a ratio between a weighted sum and a respective extended sum chosen such that the respective extended sum is greater than the other extended sums.

6. The method of claim 5 wherein the intensity of the filtered selected video component of the filtered pixel is calculated as the sum between the ratio and a coefficient proportional by a positive coefficient not exceeding one to a difference between the intensity of the unfiltered selected video component in the pixel and the ratio.

7. The method of claim 6 wherein the coefficient is calculated as a function of a noise variance and a local variance of the current picture.

8. A method of filtering noise from digital pictures comprising:

selecting a first set of pixels comprising a union of a first pixel of a current picture to be filtered and at least one second pixel adjacent the first pixel;

calculating a predetermined number of extended sums of values taken by a corresponding number of predetermined weight functions of intensities of a selected video component on the first set of pixels; and filtering the pixel based upon the calculated predetermined number of extended sums, an intensity of a filtered selected video component of a filtered pixel comprising a weighted average with predetermined weights of the ratios among weighted sums and the extended sums.

9. The method of claim 8 wherein the at least one second pixel is temporally and spatially adjacent the first pixel.

10. The method of claim 8 wherein the at least one second pixel comprises a plurality of pixels.

11. The method of claim 8 wherein the at least one second pixel belongs to the current picture.

12. The method of claim 8 wherein the at least one second pixel belongs to a preceding picture.

13. The method of claim 8 wherein each of the predetermined weight functions is specular to a respective central value calculated as a function of an unfiltered selected video component of the pixel and of a noise level.

14. The method of claim 8 wherein the intensity of the filtered selected video component of the filtered pixel is a ratio between a weighted sum and a respective extended sum chosen such that the respective extended sum is greater than the other extended sums.

15. The method of claim 14 wherein the intensity of the filtered selected video component of the filtered pixel is calculated as the sum between the ratio and a coefficient proportional by a positive coefficient not exceeding one to a difference between the intensity of the unfiltered selected video component in the pixel and the ratio.

16. The method of claim 15 wherein the coefficient is calculated as a function of a noise variance and a local variance of the current picture.

17. A noise filter for digital pictures comprising:

a plurality of first circuit units each having an input receiving a first set of pixels comprising a pixel to be filtered from a current picture and a second set of pixels temporally and spatially adjacent the pixel, each first circuit unit producing an extended sum of values taken by a respective predetermined weight function of an intensity of a selected video component of the first set of pixels and also producing a weighted sum with the respective weight function of the intensities of the selected video component of the set of pixels; and a second circuit unit coupled to respective outputs of each of the plurality of first circuit units for calculating the intensity of the selected video component of the filtered pixel as a function of the weighted sums and of the extended sums.

18. The noise filter of claim 17 wherein each of the weight functions is specular to a respective central value calculated as a function of the intensity of the unfiltered selected video component of the pixel and of a noise level.

19. The noise filter of claim 17 wherein the weight functions are determined based upon a tail detection signal.

20. A noise filter for digital pictures comprising:

at least one first circuit unit having an input receiving a first set of pixels comprising a pixel to be filtered from a current picture and a second set of pixels adjacent the pixel, said at least one first circuit unit producing an extended sum of values taken by a respective predetermined weight function of an intensity of a selected video component of the first set of pixels and also producing a weighted sum with the respective weight function of the intensities of the selected video component of the first set of pixels; and a second circuit unit coupled to an output of the at least one first circuit unit for calculating the intensity of the selected video component of the filtered pixel as a function of the weighted sums and of the extended sums.

21. A noise filter according to claim 20 wherein the second set of pixels is temporally and spatially adjacent the pixel.

22. The noise filter of claim 20 wherein each of the weight functions is specular to a respective central value calculated as a function of the intensity of the unfiltered selected video component of the pixel and of a noise level.

23. The noise filter of claim 20 wherein the weight functions are determined based upon a tail detection signal.

* * * * *